Figure 1:
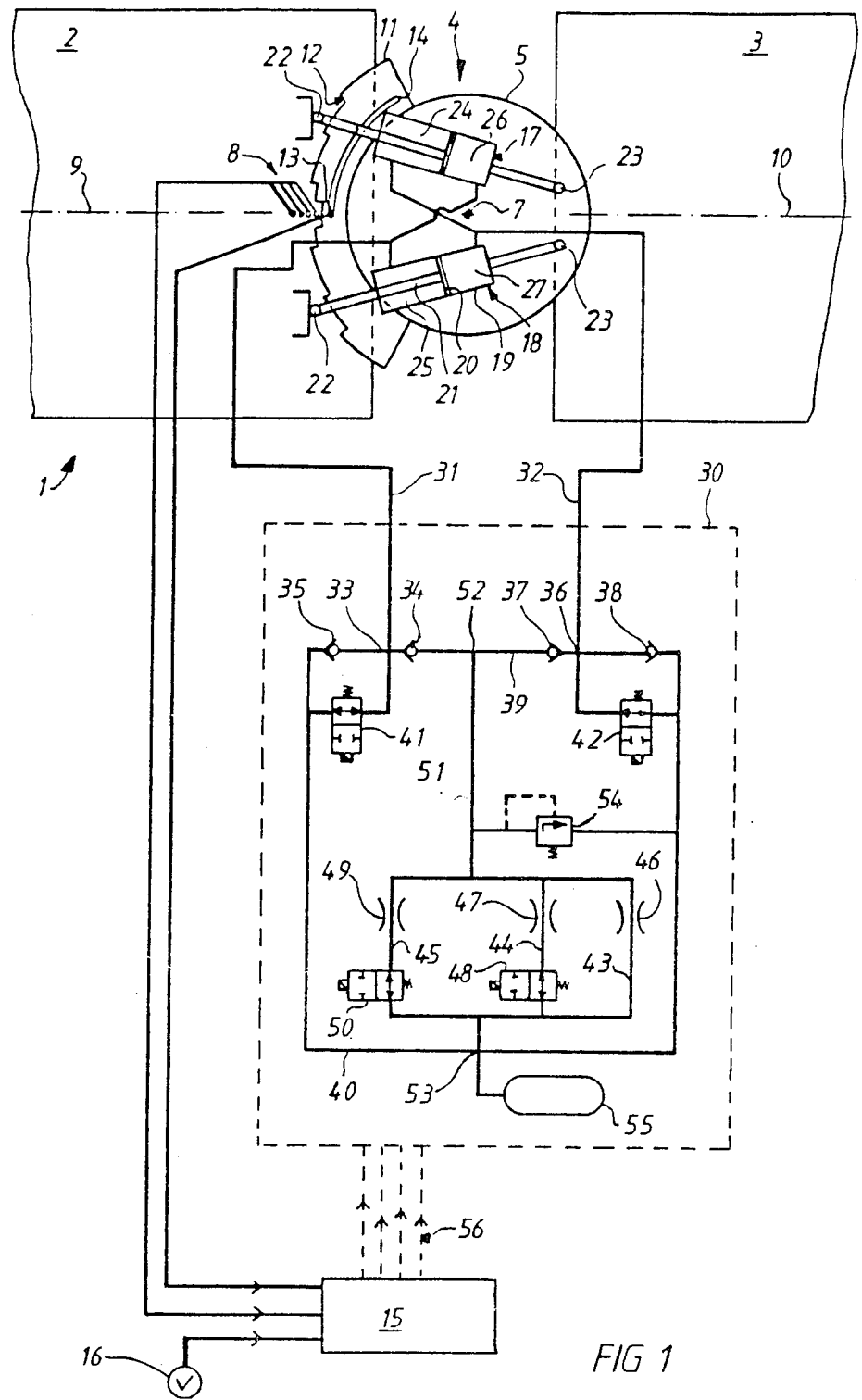

United States Patent [19]

Cromnow et al.

[11] Patent Number: 4,756,543

[45] Date of Patent: Jul. 12, 1988

[54] ARRANGEMENT FOR CONTROLLED DAMPING OF PIVOTING MOVEMENTS IN AN ARTICULATED BUS

[75] Inventors: Christer Cromnow, Katrineholm; Jan H. Jonsson, Björkvik; Lars G. Possberg, Vingåker, all of Sweden

[73] Assignee: Saab-Scania Aktiebolag, Södertälje, Sweden

[21] Appl. No.: 11,284

[22] Filed: Feb. 5, 1987

[30] Foreign Application Priority Data

Feb. 10, 1986 [SE] Sweden ................. 8600567

[51] Int. Cl.$^4$ ............................................. B62D 53/00
[52] U.S. Cl. .................................. 280/432; 280/446 B
[58] Field of Search ..................... 280/432, 446 B, 474, 280/488, 400, 403, 460 R, 424, 426, 428; 180/136, 139; 364/424

[56] References Cited

U.S. PATENT DOCUMENTS

| | | | |
|---|---|---|---|
| 4,405,145 | 9/1983 | Bergman | 280/432 |
| 4,482,165 | 11/1984 | Dawson | 280/432 |
| 4,556,231 | 12/1985 | Schultz | 280/432 |
| 4,583,756 | 4/1986 | Hornung | 280/446 B |
| 4,616,841 | 10/1986 | Reichl | 280/446 B |

FOREIGN PATENT DOCUMENTS

| | | | |
|---|---|---|---|
| 2748713 | 5/1979 | Fed. Rep. of Germany | 280/432 |
| 3004409 | 8/1981 | Fed. Rep. of Germany | |
| 3327240 | 2/1984 | Fed. Rep. of Germany | |

Primary Examiner—John J. Love
Assistant Examiner—Everett G. Diederiks, Jr.
Attorney, Agent, or Firm—Cushman, Darby & Cushman

[57] ABSTRACT

The invention relates to an arrangement for controlled damping of pivoting movements, preferably in an articulated bus. The arrangement comprises hydraulic dampers arranged between the vehicle units, a hydraulic control system which connects the dampers with each other, and an electrical control system which activates electrically operated valves in the hydraulic control system. The invention is characterized essentially in that it comprises devices which allows the electrical control system, in response to sensors which sense the pivot angle and the vehicle speed, to connect various throttles in the connecting lines between the dampers, to thereby control the damping level of the dampers.

4 Claims, 2 Drawing Sheets

| v km/h \ α° | α<9 | 9≤α<18 | 18≤α<30 | α≥30 |
|---|---|---|---|---|
| 0<V≤10 | 0 | I | II | III |
| 10<V≤30 | 0 | 0 | I | II |
| 30<V≤75 | 0 | II | II | II |
| V>75 | II | II | II | II |

FIG 2

ARRANGEMENT FOR CONTROLLED DAMPING OF PIVOTING MOVEMENTS IN AN ARTICULATED BUS

The present invention relates to an arrangement at articulated vehicles, preferably articulated buses, for controlled damping of pivoting movements between a forward vehicle unit and a rear vehicle unit pivotally connected to it.

In articulated vehicles, such as articulated buses, there is the risk, under abnormal operating conditions, that the two vehicle units may be subjected to uncontrolled pivoting movements relative to each other. This can result in them folding inwardly about a curve center in an uncontrolled manner, socalled jack-knifing, or outwardly from said curve center with the rear chassis being thrown outwardly. Such uncontrolled pivoting movements can result in dangerous traffic situations by the mere fact that the size of an articulated vehicle in general does not permit any corrections requiring any amount of space. The risk of uncontrolled angular movements is particularly noticeable in articulated vehicles in which the rearmost axle is driven, since this driving force pushes the rest of the vehicle.

In order to limit uncontrolled angular displacement in articulated vehicles, a number of different types of pivot blocks have been developed, intended to be activated when critical situations arise. One of the most well known arrangements in this respect is based on disposing hydraulic cylinders between the vehicle units, usually one hydraulic cylinder on either side of the longitudinal axis of the vehicle and a pivot plate or the like joining the vehicle units. The respective ends of the hydraulic cylinders are fixed to the vehicle units, and the hydraulic cylinders communicate with each other via a connecting line. Hydraulic fluid flows through said line to and from each cylinder depending on the angular displacement of the vehicle units. Should the rate of angular displacement be abnormally high, a blocking means is activated which completely or partially blocks the through-flow in the connecting line and thus prevents further angular displacement.

Sensing the rate of angular displacement by sensing the hydraulic fluid flow rate presents problems, however, in selecting a suitable critical boundary value for activating the pivot block. Under normal operating conditions, which includes turning at both low and high speed, the system should not be over-sensitive, but at the same time the system must be sufficiently sensitive to react quickly to an abnormal angular displacement. In certain cases, such an uncontrolled angular displacement can even happen relatively slowly. These opposing factors have often made necessary that known practical embodiments of angular blocking systems have boundary values for blocking actuation which are compromises. This means that such an angular blocking means will be activated under certain operating conditions when it should not be, and vice versa.

Another general solution is based on arranging means which sense the pivot angle between the vehicle units and means which sense the vehicle steering angle. Signals corresponding to these values are compared and if the pivot angle is greater than what is warranted by the prevailing steering angle, blocking means are activated which prevent continued pivot angle increase.

This system as well has certain disadvantages. When taking a sharp curve or turning at a street corner, the steering angle will be reduced more quickly than the pivot angle. This means that the pivot blocking means will be activated and prevent continued increase in the pivot angle. In such operating conditions it is common that the driver will begin to accelerate the vehicle as soon as the forward vehicle unit has passed the curve or corner, despite the fact that the pivot angle can be relatively great at that time. In those cases where the friction between the vehicle wheels and the road surface is minimal, the tendency of the rear vehicle unit in such a situation to continue straight ahead can cause the wheels of the middle axle to slide. In this case the activated pivot blocking means will only prevent continued increase in the pivot angle, but not be able to prevent the rear vehicle unit from making an uncontrolled movement.

In another known general solution, so-called high-speed damping, it is sensed when the vehicle exceeds a certain high speed and when the steering angle exceeds a certain low value. When this happens, a powerful damping is triggered by coupling in a throttle in a connecting line between the dampers. It is also known to arrange additional throttles in the connecting line to thus be able to engage a lower degree of damping at lower speeds and at lesser steering angles.

This system has, however, serious deficiencies when driving at low speed and at large pivot angles. Since only the steering angle is sensed, it is impossible to sense the pivot angle with this system. The change in the level of damping can occur quickly, thus making for uneven and jerky driving. There is also the risk that these rapid changes, especially when driving on a slippery road surface, will initiate an uncontrolled pivoting movement.

The present invention has the purpose of limiting, for articulated vehicles, particularly articulated buses, the occurrence of uncontrolled pivoting movements in a manner which does not have the disadvantages occurring in known solutions. The purpose of the invention is thus to provide damping of the pivoting movements at a plurality of different levels depending on appropriate vehicle parameters. According to the invention the arrangement comprises at least two hydraulic dampers arranged between the vehicle units, a hydraulic control system hydraulically connected to the dampers, an electrical control system electrically connected to electrically operated valves in the hydraulic control system and to a number of sensors sensing various vehicle parameters, of which the vehicle speed is one parameter.

The invention is characterized in that the arrangement comprises sensors which sense and send signals to the electrical control system representing the pivot angle between the vehicle units, that the electrical control system is arranged, via electromagnetic valves to connect in the connecting lines between the dampers in the hydraulic control system various throttles representing various levels of throttling, and that the electrical control system is arranged to connect the various throttles in response to parameter values representing the pivot angle and the vehicle speed.

By allowing the magnitude of the pivot angle and the vehicle speed to control, in accordance with the invention, the damping between the vehicle units, the damping for each particular driving situation can be optimized. The damping can be selected at a number of different levels and the transitions between the various levels can be made softly, which gives the vehicle a stable feel when driving.

Further characteristic features and advantages of the invention are revealed in the accompanying examples, which refer to the accompanying drawings.

FIG. 1 shows a schematic coupling diagram of an arrangement according to the invention for damping pivot angular movements, and FIG. 2 is a table of the damping as a function of vehicle speed and pivot angle displacement.

A vehicle, in particular an articulated bus 1, comprises a forward vehicle unit 2 and a rear vehicle unit 3, which are articulated to each other via a pivot joint 4. The forward vehicle unit 2 comprises a front axle carrying steered wheels and a middle axle carrying free rolling wheels (not shown). The rear vehicle unit 3 comprises a rear shaft carrying drive wheels (not shown), which are drivingly connected in a conventional manner to a drive unit arranged in the rear vehicle unit 3.

The pivot joint 4 is made up of two pivot plates, of which the upper plate is securely fixed to the rear vehicle unit 3, and the lower plate is securely fixed to the forward vehicle unit 2. Said plates slide against each other and are fixed horizontally to each other by a central vertical pivot bolt 7 (shown only schematically here as a pivot point), about which the plates and thus also the vehicle units 2,3 can pivot relative to each other.

The sensing of the relative pivoting between the vehicle units 2,3, the pivot angle $\alpha$, is carried out with the help of four no-contact position sensors 8 fixed to the upper pivot plate 5 which is securely fixed to the rear vehicle unit 3. The sensors 8 are placed in a row in the radial direction from the pivot point 7 of the joint 4 and parallel to the longitudinal axis 10 of the rear vehicle unit 3. The sensors 8 cooperate with a cam disc 11 fixed to the lower pivot plate, said cam disc being provided with four radial steps 12 arranged symmetrically on either side of the longitudinal axis 9 of the forward vehicle unit 2. In FIG. 1 the dimensions of the cam disc 11 have been exaggerated to more clearly reveal its shape. The steps 12 of the cam disc 11 are arranged to be sensed during the pivot movement, and each step 12 can only be sensed by one of the four sensors 8. The steps 12 represent different angle sectors, and by sensing which of the steps 12 is in front of its respective sensor 8, an indication is given of the pivot angle $\alpha$ between the vehicle units 2,3. One step 14 is selected so that a sensor 8 senses when the pivot angle is greater than 9 degrees. The rest of the steps 12 are selected so that a sensor is activated when exceeding angles of 18 degrees, 30 degrees and 47 degrees, respectively. The maximum pivot angle is circa 50 degrees. A pivot angle of 0 degrees corresponds to driving straight ahead. By virtue of the fact that the cam disc 11 is arranged symmetrically in relation to the longitudinal axis 9 of the forward vehicle unit 2, an indication of the above mentioned pivot angles is obtained regardless of the direction of pivoting. A fifth positional sensor 13 is arranged analogously to the four other sensors 8 and interacts with a groove 14 in the cam disc 11. Said groove 14 extends along the cam disc 11 only on one side of the longitudinal axis 9 of the forward vehicle unit 2. The fifth sensor 13 is used to indicate in which direction the pivoting occurs. The signals from the respective sensors 8,13 are led to an electronic control unit 15, which transforms in a conventional manner the respective signals to suitable signals representing the various pivot angles and the direction of pivoting. In the accompanying FIG. 1, the connection of the sensors 8,13 to the control unit 15 have only been represented schematically. The control unit 15 is also connected to a speed sensor 16, which provides a signal representing the speed of the vehicle 1. Suitably, this sensor 16 is arranged to sense the rotational speed of a propeller shaft between the vehicle drive unit and its driven wheels. Since its design is well-known, it will not be described in more detail here.

In the joint 4 between the vehicle units 2,3 there are also two hydraulic dampers 17,18, each comprising a hydraulic cylinder 19 in which a piston 20 slides. The pistons 20 are connected via piston rods 21 to forward journal shafts 22 mounted in brackets which are securely fixed to the forward vehicle unit 2, while the respective cylinders 19 are connected to rear journal shafts 23 on the upper pivot plate 5 fixed to the rear vehicle unit. The forward pivot shafts 22 of the dampers 17,18 are symmetrically located relative to the longitudinal shaft 9 of the forward vehicle unit 2 and the rear journal shafts of the dampers 17,18 are symmetrically located relative to the longitudinal axis 10 of the rear vehicle unit 3.

The pistons 20 divide each cylinder 19 into a forward chamber 24,25 and a rear chamber 26,27. The chambers 24-27 are connected crosswise to each other, so that the forward chamber 24 in one damper 17 communicates with the rear chamber 27 in the other damper 18 and vice versa. In this manner, two cooperating spaces 24,27 and 25,26 are formed, said spaces being connected via a first and a second hydraulic line 31,32 to a hydraulic control system 30, which is represented schematically in FIG. 1. The two spaces 24,27 and 25,26, respectively, are also connected via the control system 30 to each other. The first hydraulic line 31 is connected to a first branch point 33, to which there are also connected a first and a second non-return valve 34,35. The first non-return valve 34 permits flow only from the branch point 33, while the second non-return valve 35 permits flow only to the branch point 33. In an analogous manner, the second hydraulic line 32 is connected to a second branch point 36, to which a third non-return valve 37 is connected which only permits flow from the branch point 36, and a fourth non-return valve 38 is connected which only permits flow to the branch point 36. The first and the third non-return valves 34,37 are connected to each other via a third hydraulic line 39. The second and the fourth non-return valves 35,38 are also connected to each other via a fourth hydraulic line 40.

Parallel to the second non-return valve 35 there is coupled between the third and the fourth line 39,40 a so-called switch valve 41, which consists of an electrically operated valve with a normally open position and an activated closed position. In the same manner a second switch valve 42 is arranged parallel to the fourth non-return valve 38. The third and fourth lines 39,40 are joined to each other via three throttle lines 43,44,45 coupled in parallel. The first throttle line 43 comprises only a fixed first constriction 46. The second throttle line 44 comprises a fixed second constriction 47 in series with an electromagnetic valve 48, which has a normally open position and an activated closed position. The third throttle line 45 comprises a fixed third constriction 49 in series with an electromagnetic valve 50, which has a normally open position and an activated closed position.

The three throttle lines 43,44,45 are connected at their respective ends via a fifth hydraulic line 51 to a third branch point 52 on the third line 39. At their respective other ends the throttle lines 43,44,45 are connected to a fourth branch point 53 on the fourth line 40.

An overflow valve 54 is coupled between this fifth line 51 and the fourth line 40, so that if the pressure in the fifth line 51 should exceed a certain value, hydraulic fluid will flow directly to the fourth line 40. Under all normal operating conditions, however, the overflow valve 54 is closed.

An accumulator tank 55 is also connected to the fourth line 40 at the fourth branch point 53. Hydraulic fluid can be directed to and from this tank as the volume varies in the hydraulic system. Such variations in volume can be caused by the volume in the different chambers 24-27 of the dampers 17,18 being different due to space requirements of the piston rod 21 or temperature variations in the hydraulic fluid.

The electromagnetic valves 41,42,48,50 of the hydraulic control system 30 are controlled in response to signals from the electrical control system 15. In FIG. 1 the connections of the electrical control system 15 to the valves 41,42,48,50 is only schematically represented as four lines 56 between the control systems 15,30.

The electrical control system 15 includes a program which, in response to input signals from the sensors 8, 13 and 16, sensing the pivot angle, the pivoting direction and the vehicle speed, activates the various valves 41,42,48,50. The accompanying FIG. 2 shows in tabular form how the various degrees of damping are obtained in response to the pivot angle $\alpha$ and the vehicle speed v. As can be seen from FIG. 2, the intervals in question for the pivot angle agree with those sensed by the sensors 8. 0 indicates that no or virtually no damping is provided, I indicates that the damping is weak, II that the damping is moderate and III that the damping is hard.

When damping is at level 0, there is an exchange of hydraulic fluid in the respective chambers 24-27 of the dampers 17,18 without any obstacle. In this case the control system 30 merely acts as a communication between the respective spaces 24,27 and 25,26. The two switch valves 41,42 assume their normally open positions which allows hydraulic fluid from the first hydraulic line 31 to flow via the first switch valve 41, the fourth hydraulic line 40 and the second switch valve 42 to the second hydraulic line 32. Damping at level 0 occurs primarily when driving straight ahead or at small pivot angles $\alpha$, for example less than 9 degrees, at speeds v of less than a relatively high vehicle speed, for example 75 km/h.

Damping at level I corresponds to a soft damping which occurs at moderate pivot angles $\alpha$ at low vehicle speeds v, and FIG. 2 gives exemplifying boundary values. When pivoting occurs, the position sensors 8,13 sense its magnitude and direction. When taking a curve to the right, for example, the chambers 25,26 of the dampers 17,18 will reduce their volume, while the chambers 24,27 will correspondingly increase their volume. Hydraulic fluid flows to the hydraulic control system via the first hydraulic fluid line 31. At the same time the first switch valve 41 is activated by the electrical control system in response to signals representing the pivoting direction, whereupon this valve 41 assumes its closed position. The hydraulic fluid therefore flows via the second non-return valve 34 to the third hydraulic line 39. From there it flows to the fifth hydraulic line 51 and via the three parallel throttle lines 43,44,45 to the fourth line 40. By virtue of the fact that in this case the fluid flows through the three parallel throttles 46,47,49, there is only a weak restriction of the fluid flow. The fluid then continues via the second switch valve 42 to the second hydraulic fluid line 32 and to the chambers 24,27 of the damping means. After the pivot angle has reached its greatest value, there is a straightening out of the joint 4. Here the volumes of the chambers 24,27 are changed in the opposite direction and hydraulic fluid must therefore be conducted in the opposite direction to that just described. The first switch valve 41 remains, however, in its activated closed position. The hydraulic fluid will then be conducted from the second line 32 via the second switch valve 42, the fourth line 40 and via the first non-return valve 35 to the first line 31. Thus the throttles 46,47,49 will not have any damping effect. The dampers 17,18 will thus only have a damping effect as the vehicle units 2,3 are folded towards each other, while no damping is obtained when straightening them out. When pivoting in the opposite direction, i.e. when turning to the left, the second switch valve 42 is activated instead of the first switch valve 41. Otherwise, hydraulic fluid flows analogously through the control system 30.

Damping at level II is effected in the same manner as at level I, but the solenoid valve 48 is activated in the second throttle line 44. Thus fluid will only flow through two parallel throttle lines 46,49. Correspondingly for damping at level III, solenoid valve 50 in the third throttle line 45 is also activated, and fluid only flows through one throttle 46.

Tests have shown that when driving at relatively high speed, for example more than 75 km/h, it is advantageous to have the dampers activated both when the vehicle units are folded towards each other and when straightened out. For this reason the above description applies to the situation where there is no damping as the vehicle units are straightened out at vehicle speeds less than the above mentioned speed. At speeds over this speed, both of the switch valves are activated simultaneously, and thus no hydraulic fluid can pass through the switch valve. Instead, the hydraulic fluid passes in both directions through the throttle lines in accordance with the above description.

The arrangement according to the invention makes it possible to dampen pivoting movements in response to both the magnitude of the angular displacement and the speed of the vehicle. An optimum damping can be obtained for each situation without it having a negative effect on other situations. By virtue of the fact that the damping is arranged in a plurality of different levels, these can be selected so that the transition between the levels is hardly noticeable.

The described embodiment has essentially conventional components and therefore the functional reliability can be kept high at the same time as costs are kept low.

It is also possible to combine the arrangement according to the invention with already existing systems for control of pivoting movements in articulated buses, and thus achieve additional advantages. The invention can be modified within the scope of the following patent claims and be made different from what is stated in the example. Instead of the fixed throttles it is possible to use variable throttles, which makes it possible, for each vehicle, to set an optimum throttling for different operating conditions. Instead of using throttles coupled in parallel, it is also possible to use throttles coupled in series, which can be by-passed with suitable solenoid valves.

It is also possible to use a continuously variable throttle instead of stepped throttling levels. This would provide a continuously variable damping.

The boundary values given in the description and in FIG. 2 for the pivot angle and the vehicle speed can also be changed if so desired.

We claim:

1. Arrangement for controlled damping of pivoting movements in a vehicle with two vehicle units pivotally joined to each other, particularly an articulated bus, comprising at least two hydraulic dampers arranged between the vehicle units, a hydraulic control system hydraulically connected to the dampers, an electrical control system electrically connected to electrically operated valves in the hydraulic control system and to a number of sensors sensing various vehicle parameters, of which the vehicle speed is one parameter, the pivot angle between the vehicle units is another parameter and the direction of pivoting between the vehicle units is a third parameter, said electrical control system being arranged, via said electrically operated valves to connect in the connecting lines between the dampers in the hydraulic control system various throttles, representing various levels of throttling, in response to parameter values representing both the pivot angle and the vehicle speed said hydraulic control system further including electically operated bypass valves and said electrical control system is arranged, in response to signals indicating the direction of pivoting between the vehicle units, at least at vehicle speeds below a predetermined value, to actuate said bypass valves when the vehicle units are unfolded towards alignment with each other.

2. Arrangement according to claim 1, characterized in that the hydraulic control system comprises three throttle lines coupled in parallel to each other, each line having one throttle.

3. Arrangement according to claim 2, characterized in that at least two of the throttle lines comprise electrically operated valves with which the flow through the respective throttle line can be blocked.

4. Arrangement as in claim 1 wherein each damper includes a piston and cylinder unit having two chambers, one on each side of the piston, said hydraulic control system including a first hydraulic line connected to one chamber of each piston and cylinder unit and a second hydraulic line connected to the other chamber of each piston and cylinder unit, said hydraulic control system including means for placing said first and second hydraulic lines in communication with each other and said throttles being arranged to controllably throttle the communication between said first and second hydraulic lines and the arrangement being such that said electrical control system effects essentially free flow of hydraulic fluid between said first and second hydraulic lines when no damping is desired and effects throttled flow of hydraulic fuid between said first and second hydraulic lines when damping is desired in response to pivot angle and vehicle speed.

* * * * *